United States Patent
Chow et al.

[15] 3,640,838
[45] Feb. 8, 1972

[54] IONICALLY INTERACTING POLYMERS

[72] Inventors: Sui-Wu Chow; Walter H. Smarook, both of Somerville, N.J.

[73] Assignee: Union Carbide Corporation, New York, N.Y.

[22] Filed: June 24, 1970

[21] Appl. No.: 49,568

Related U.S. Application Data

[63] Continuation-in-part of Ser. No. 669,291, Sept. 20, 1967, abandoned.

[52] U.S. Cl. .................... 161/190, 117/123, 117/124, 117/127, 117/128.4, 117/132, 117/138.8, 117/143, 117/147, 117/152, 117/161, 161/203, 161/204, 161/208, 161/218, 161/219, 161/251, 161/252, 161/254, 260/878, 260/881, 260/883, 260/884, 260/886

[51] Int. Cl. .................................. C08f 29/34, B32b 9/00
[58] Field of Search .................. 260/878, DIG. 31, 875, 883

[56] References Cited

UNITED STATES PATENTS

| | | | |
|---|---|---|---|
| 2,999,056 | 9/1961 | Tanner | 204/154 |
| 3,247,133 | 4/1966 | Kwo-wei | 260/2.1 |
| 3,322,734 | 5/1967 | Rees | 260/79.3 |
| 3,325,561 | 6/1967 | Grillo et al. | 260/857 |
| 3,337,517 | 8/1967 | Anspon | 260/86.7 |
| 3,388,186 | 6/1968 | Kray et al. | 260/857 |

*Primary Examiner*—Joseph L. Schofer
*Assistant Examiner*—A. Holler
*Attorney*—Paul A. Rose, Aldo John Cozzi and Bernard Francis Crowe

[57] ABSTRACT

Reversibly cross-linked, thermoplastic, normally solid polymer salt compositions have been prepared by copolymerizing a prepolymer of a carboxyl containing polyolefin, having 2 to 50 mole percent carboxylic acid groups, and about 10 to 100 mole percent of its carboxyl groups neutralized with an amino vinyl monomer such as an alkylaminoalkyl acrylate, an alkylaminoalkyl methacrylate, or an amino substituted styrene with a vinyl monomer such as an alkyl acrylate, an alkyl methacrylate, acrylamide, methacrylamide, styrene, alkyl substituted styrenes, vinyl chloride, vinyl esters containing from three to 20 carbon atoms or vinyl alkyl ethers containing from three to 20 carbon atoms.

These polymer salt compositions are particularly useful in that they exhibit a high degree of adhesion to plasticized vinyl chloride resins, unlike most other commonly known adhesives, as well as other substrates.

14 Claims, No Drawings

IONICALLY INTERACTING POLYMERS

This is a continuation-in-part of Ser. No. 669,291 filed Sept. 20, 1967, now abandoned.

This invention relates to reversibly cross-linked, thermoplastic normally solid polymer salt compositions of a carboxyl containing polyolefin which had been neutralized with an amino vinyl monomer prepolymer copolymerized with a vinyl comonomer.

Despite the expanding use of vinyl resins, that is, homopolymers or copolymer of vinyl chloride in the form of films, sheets, structural forms, and other applications, the lack of suitable adhesives for bonding vinyl resins to other materials has seriously curtailed their utilization in many areas where they would otherwise be suitable. This lack of adhesion is aggravated by the fact that most vinyl resins contain a plasticizer such as dioctyl phthalate which often migrates to the surface of the vinyl resin and further reduces adhesion.

It has now been found that a new class of polymers that is, ionically interacting polymers are uniquely useful for bonding vinyl chloride resins and other substrates to themselves as well as to other substrates. These ionically interacting polymers are reversibly cross-linked, thermoplastic, normally solid polymer salt compositions comprising:

A. about 20 to 80 percent by weight of a prepolymer of a carboxyl containing polyolefin having from 2 to 50 mole percent carboxyl groups and about 10 to 100 mole percent of said carboxyl groups neutralized with an amino vinyl monomer selected from the class consisting of alkylaminoalkyl acrylates having from three to 13 carbon atoms in the acrylate moiety, alkylaminoalkyl methacrylates having from four to 13 carbon atoms in the methacrylate moiety, and amino substituted styrene having the structural formula:

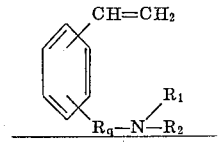

wherein $q$ is an integer having values of from 0 to 1, R is a divalent aliphatic radical having from one to six carbon atoms, and each of $R_1$ and $R_2$ is a radical selected from the group consisting of hydrogen and alkyl groups having from one to four carbon atoms, said prepolymer reaction product being copolymerized with:

B. about 80 to 20 percent by weight of a vinyl monomer selected from the class consisting of alkyl acrylates, alkyl methacrylates, acrylamide, methacrylamide, styrene, alkyl substituted styrenes having one to 16 carbon atoms in the alkyl group, vinyl chloride, vinyl esters containing from about three to 20 carbon atoms and vinyl alkyl ethers containing from about three to 20 carbon atoms.

The polymer salt compositions of this invention not only exhibit excellent adhesion to vinyl resins but also to other substrates such as metals, as for example, aluminum, steel, galvanized iron, zinc, tin, copper, and the like, siliceous materials such as glass and the like, cellulosic materials such as wood, paper, and the like, vinylidene chloride polymers, thermoplastic polyhydroxy ethers, polystyrenes and rubber-modified styrene polymers, Dynel, that is, a modacrylic synthetic fiber made by the copolymerization of 40 percent acrylonitrile and 60 percent vinyl chloride, polyurethanes, paperlike materials formed from olefin polymer compositions such as those disclosed in U.S. Pat. No. 3,234,313, Belgian Pat. Nos. 6,719 published Dec. 16, 1964, 27,296 published Feb. 4, 1966 and 27,600 published May 3, 1966, and the like.

The degree of neutralization required for optimum adhesion of the polymer salt compositions of this invention varies with the particular substrate or substrates bonded therewith. For example in the specific case where an ethylene-acrylic acid copolymer containing 18 percent by weight copolymerized therein was neutralized with varying amounts of dimethylaminoethyl methacrylate ranging from ratios of moles of the latter to moles of carboxyl in the copolymer of 0.1 to 1.0 where the resultant neutralized products or prepolymers were then copolymerized with methyl methacrylate, the adhesion values with vinyl-aluminum laminates was quite different from those with polyethylene-aluminum laminates. While adhesion to vinyl resins increased by increasing the content of both dimethylaminoethyl and methyl methacrylate; adhesion to polyethylene decreased. Thus it was found that for this particular polymer salt system it was preferred to use a prepolymer having about 15 to 30 percent of the carboxyl groups neutralized for optimum adhesion to polyethylene.

While about 20 to 80 percent by weight of prepolymer with about 80 to 20 percent by weight of vinyl monomer can be used in the practice of this invention, it is preferred to use about 40 to 60 percent by weight of the former and about 60 to 40 percent by weight of the latter.

Although not essential, it is preferred to employ as the carboxyl containing polyolefins of this invention interpolymers of alpha-olefins having the general formula:

where R' is selected from the group consisting of hydrogen and alkyl radicals having up to about 10 carbon atoms, the olefin content of said interpolymer being at least 50 mole percent of the total interpolymer and interpolymerized therewith an $\alpha, \beta$-ethylenically unsaturated carboxylic acid having 1 or more carboxyl groups, said unsaturated carboxylic acid constituting up to about 50 mole percent of the total interpolymer.

The carboxyl content of the aforementioned carboxyl containing polyolefins is preferably in the range of about 3 to 25 mole percent of the total carboxyl containing polyolefin although contents of about 1 to 50 mole percent can also be employed if desired.

It is preferred to employ random carboxyl containing polyolefins prepared by the free radical polymerization of an $\alpha$-olefin with an $\alpha, \beta$-ethylenically unsaturated monocarboxylic acid. It is further preferred to employ ethylene as the $\alpha$-olefin and acrylic or methacrylic acid as the $\alpha, \beta$-ethylenically unsaturated monocarboxylic acid. If one desires, however, it is also possible to employ block or graft carboxyl containing polyolefins.

The alkylaminoalkyl acrylates and alkylaminoalkyl methacrylates used in the present invention to prepare the prepolymer reaction product contain about six to 14 carbon atoms. Specific examples include: dimethylaminoethyl acrylate, diethylaminoethyl acrylate, diethylaminopropyl acrylate, dimethylaminoethyl methacrylate, diethylaminoethyl methacrylate, diethylaminopropyl methacrylate, and the like.

Representative amino substituted styrenes falling within the purview of the general formula given above includes such compounds as o, p or m-amino styrene, N-methylamino styrene, N,N-dimethylamino styrene, dimethylaminomethyl styrenes, dimethylaminoethyl styrenes, diethylaminoethyl styrenes, dimethylaminohexyl styrenes, diethylaminoctyl styrenes, diethylaminodecyl styrenes, vinyl benzytrimethylammonium hydroxide, vinyl phenyl trimethylammonium hydroxide and the like.

Among the vinyl monomers suitable for copolymerization with the prepolymer reaction product are alkyl acrylates and methacrylates containing up to about 18 carbon atoms in the alkyl group. Specific examples include: methyl acrylate, ethyl acrylate, propyl acrylate, butyl acrylate, hexyl acrylate, 2-ethylhexyl acrylate, dodecyl acrylate, hexadecyl acrylate, octadecyl acrylate, methyl methacrylate, ethyl methacrylate, butyl methacrylate, hexyl methacrylate, 2-ethylhexyl methacrylate, decyl methacrylate, dodecyl methacrylate, hexadecyl methacrylate, octyldecyl methacrylate, and the like.

Alkyl substituted styrenes suitable for use as the vinyl monomer include p-methylstyrene, p-ethylstyrene, p-isobutylstyrene, m-methylstyrene, m-ethylstyrene, m-isobutylstyrene, and the like.

Vinyl esters suitable for use as the vinyl comonomer include vinyl formate, vinyl acetate, vinyl propionate, vinyl butyrate, vinyl stearate, and the like.

Vinyl alkyl ethers suitable as comonomers include vinyl methyl ether, vinyl ethyl ether, vinyl propyl ether, vinyl isopropyl ether, vinyl butyl ether, vinyl octadecyl ether, and the like.

The polymer salt compositions of this invention can be prepared by first neutralizing at least 10 mole percent the carboxyl containing polyolefin with the amino vinyl monomer to afford a prepolymer. This is preferably effected in a common solvent such as a cyclic ether as for example tetrahydrofuran or dioxane. Other solvents which can be used include mixtures of alkanols with aliphatic hydrocarbons or aromatic hydrocarbons such as benzene, toluene, xylene, and the like. The temperature at which this first step is carried out is not narrowly critical but depends upon the concentration and solubility of the reactants. A convenient temperature range extends from room temperature up to the boiling point of the particular solvent used. The salt which arises as a consequence can be isolated by precipitation with a coagulating solvent as for example a saturated hydrocarbon such as hexene, heptane or the like. However, it has been found more convenient to permit the prepolymer to remain in solution and then proceed with the formation of the vinyl copolymer by copolymerizing one of the vinyl monomers cited above with the prepolymer. The latter step can be affected with conventional free radical vinyl polymerization initiators such as peroxides, peroxydicarbonates, azo compounds, and the like. Suitable peroxides include benzoyl peroxide, lauroyl peroxide, capryloyl peroxide and the like. Exemplary of peroxydicarbonates are dipropyl peroxydicarbonate, diisobutyl peroxydicarbonate and the like. Representative azo compounds include: azobisisobutyronitrile, $\alpha,\alpha'$azodicyclohexanecarbonitrile azobis-$\alpha$, $\alpha'$-azodicyclohexanecarbonitrile, azobis-$\alpha,\alpha'$-dimethyl valeronitrile, di-methyl-$\alpha,\alpha'$-azodiisobutyrate and the like. This final polymerization step can be affected at temperatures of about 20° to 130° C. depending upon the decomposition temperature of the initiator chosen and the molecular weight of the product obtained. Pressure is not critical but for convenience atmospheric pressure are preferred although subatmospheric and superatmospheric pressures can be used if desired.

The polymer salt compositions resulting from the copolymerization described above can be recovered from the reaction media by evaporation of the solvents or by precipitation with a coagulating solvent by procedures well known in the art. The products can be obtained as dispersions or as a solid polymer by conventional techniques well known in the polymer art such as spray dying, centrifugation, vented extrusion, precipitation with a nonsolvent such as aliphatic hydrocarbons and the like.

Adhesive bonding is obtained with the polymer salt compositions of this invention by wetting out the substrate with the copolymer composition. In one embodiment it is preferred to heat the polymer salt composition which has previously been pressed into the form of a film to a temperature of about 120° to 200° C. in intimate content with the substrate to be bonded at moderate pressures of about 1 to 300 p.s.i. for at least 2 seconds.

Adhesive bonding can also be effected by precoating the substrate to be bonded from a dispersion of the copolymer salt compositions by conventional techniques such as dip coating, brushing, roller coating and the like, and subsequently heat activating the precoat, while contacting the precoated substrates. It is understood that either one substrate or both of a pair can be precoated prior to bonding.

As an alternative application one preheated adherend precoated with the adhesive polymeric salt compositions of this invention can be bonded to foaming polyurethane, vinyl or similar resins. For example, in the case of polyurethanes they can be formed in situ by foaming a diisocyanate-polyol formulation in contact with a precoated substrate heated to about 75° C. The exotherm generated by the diisocyanate-polyol reaction is sufficient to fuse the resultant polyurethane to the precoated adherend. Similarly vinyl resins can be melted, foamed with blowing agents, well known in the art, and bonded to preheated, precoated adherends.

Temperature is not narrowly critical and bonding may be effective above and below the ranges shown. The method of heat transfer is not critical but a minimum pressure is required to ensure adequate surface contact between the substrate and the adhesive. Suitable methods of heat transfer include heating by convection (hot air), conduction (laminating and pressing), radiation (infrared ovens), and the like.

Composite laminates consisting of various combination of polymeric paperlike compositions, cellulosic, polyhydroxyether, metal, magnetic metal oxide, rubber modified styrene polymers, polystyrene, vitreous, vinyl chloride polymer, vinylidene chloride polymer substrates and the like can be fabricated by in-line techniques well known in the art.

Examples of cellulosic substrates include: wood, plywood, sawdust, cane, bamboo, rattan, paper and the like.

Examples of metal substrates include: aluminum, chromium, cobalt, copper, gold, iron, lead, magnesium, nickel, platinum, silver, tin, titanium, tungsten, vanadium, zinc, and the like as well as alloys such as alloy steel, galvanized iron, alnico, brass, bronze, carbon steel, cast iron, chromium steel, nichrome, pewter, solder, stainless steel, sterling silver, and the like. These metal substrates can be in the form of powders, granules, whiskers, leaves, foils, sheets, bars, rods, wire and the like. Magnetic metal oxides include those of Fe and Cr.

Included within the definition of vitreous substrates are: glass, fiberglas, ceramics, clays, china, porcelain and the like.

Polyhydroxyether substrates are the linear reaction products of a dihydric phenol and epichlorohydrin having a molecular weight of greater than 25,000 such as those referred to in U.S. Pat. No. 3,305,528.

The preparation of polyurethanes useful in this invention are disclosed in the textbook "Polyurethanes—Chemistry and Technology," J. H. Saunders and K. C. Frisch, Interscience Publishers, N.Y. 19.

The vinyl chloride and vinylidene chloride resins useful in this invention are described in "Vinyl and Related Compounds" by C. E. Schildknecht, John Wiley and Sons, Inc., N.Y.C. 1952.

Polystyrenes and rubber modified styrene polymers are described in "Styrene," R. H. Boundy and R. F. Boyer, Reinhold Publishing Corp., N.Y.C. 1952, p. 1,226.

The invention is further described by the examples which follows in which all parts and percentages are by weight unless otherwise specified.

EXAMPLE 1

Into a 1-liter round-bottom three-necked flask with a stirrer, thermometer, and nitrogen inlet tube was placed 38.2 g. of an ethylene acrylic acid copolymer containing 8.3 percent mole acrylic acid copolymerized therein and having a melt index of 80 dg./min. together with 270 cc. of dioxane. This charge was stirred under a nitrogen atmosphere at a temperature of 80° to 90° C. until solution was effected and then 18.4 g. of diethylaminoethyl acrylate was added. The resultant solution was stirred for an additional 15 to 30 minutes after which time 12.7 g. of methyl methacrylate and 0.065 g. of azobisisobutyronitrile were added. Then 46 g. of methyl methacrylate and an additional 0.065 g. of azobisisobutyronitrile in 30 cc. of dioxane were added over a period of 30 minutes to one hour at 80° to 90° C. Stirring at 80° to 90° C. was continued for an additional 2 hours. A polymer salt composition was isolated by the addition of the reaction mixture to excess hexane. The polymer salt composition which precipitated was compression molded into plaques at a press temperature of about 150° C. A 10-g. sample of this polymer salt composition was extracted with acetone in a Soxhlet extractor and indicated that 67 percent of the polymer salt composition was insoluble and 33 percent soluble in acetone. The soluble fraction was a copolymer of methyl methacrylate and diethylaminoethyl acrylate (as indicated by its infrared absorption spectrum) which had a reduced viscosity when measured as a 0.2 weight percent solution in chloroform at 30° C. of 0.2. The insoluble fraction was ethylene/acrylic acid copolymer as indicated by its infrared absorption spectrum.

EXAMPLE 2

The procedure described in Example 1 with exception that 15.7 g. of dimethylaminoethyl methacrylate was substituted for the diethylaminoethyl acrylate. The resultant polymer salt composition contained 70 percent acetone insoluble fraction and a 30 percent soluble fraction. The reduced viscosity of the soluble copolymer when measured as described in Example 1 was 0.2. Films of the polymer salt composition were also prepared by compression molding at 150° C.

EXAMPLE 3

The procedure described in Example 1 was followed with the exception that 54 g. of ethyl acrylate was substituted for the methyl methacrylate and 15.7 g. of dimethylaminoethyl methacrylate was substituted for diethylaminoethyl acrylate. This polymer salt composition consisted of an acetone insoluble fraction of 61 percent and an acetone soluble fraction of 39 percent. The reduced viscosity of the soluble fraction of the copolymer was 1.0.

EXAMPLE 4

Using the procedure described in Example 1 with the exception that 55.3 g. of ethyl acrylate substituted for the methyl methacrylate. This polymer salt composition had an acetone insoluble fraction of 62 percent and an acetone soluble fraction of 38 percent. The reduced viscosity of the soluble fraction of the copolymer was 2.2.

The adhesion of the compositions of this invention was demonstrated with a series of substrates using the polymer salt composition product obtained in Example 2 in film form 2 to 10 mils thick to effect lamination with a series of dissimilar substrates. The lamination temperature, the peel strength of the laminate obtained, and the identities of the various substrates are delineated in the table I. Peel strengths were determined by peeling back a portion of the film of copolymer composition product of Example 1 adhering to the respective substrate and then applying a force to this peeled back portion and measuring the force required to peel the film from the substrate with an Instron Tensile Testing machine. A suitable method for measuring peel strength is described in ASTM D-903-49. Peel strength data are given in pounds per linear inch (lb./in.) at 2 inch/minute crosshead speed of the Instron Tensile Testing machine. In examples where the peel strengths of laminates rather than those of coated single substrates were measured, one of the lamina was peeled back and the peeling force then applied.

TABLE I

| Substrate | Lamination Temperature °C. | Peel Strength Value lb./in. |
|---|---|---|
| Dynel[1] | 160 | 5 |
| Vinyl chloride/ Vinyl acetate Copolymer[2] (98/2) | 195 | 16 |
| Aluminum | 160–170 | 7 |
| Vinyl chloride/ Vinyl acetate Copolymer[3] (98/2) | 160–170 | 12–22 |
| polyvinyl chloride | 160–170 | 18–30 |
| Saran[4] | 160 | 14 |
| Hydroquinone Polyhydroxyether[5] | 160–170 | Film broke |
| High Density Polyethylene | 195 | 3–4 |
| Galvanized iron | 160 | 9.5 |

1. Trademark for fibers of acrylonitrile/vinyl chloride (40/60) copolymers
2. Plasticized with dioctyl phthalate.
3. Plasticized with polyester plasticizer.
4. Trademark for vinylidene chloride/vinyl chloride copolymers.
5. Condensation polymer of hydroquinone and epichlorohydrin.

EXAMPLES 5–10

Into a 1-liter round-bottom flask fitted with a stirrer, thermometer, condenser and nitrogen inlet tube was charged 38.2 g. of an ethylene acrylic acid copolymer containing 8.3 mole percent acrylic acid copolymerized therein together with 165 ml. of a 50:50 toluene-butanol mixture. Solution was effected by stirring at 80° to 90° C. under a nitrogen atmosphere. In six separate experiments dimethylaminoethyl methacrylate in amounts equal to 15.7 g., 12.5 g., 9.45 g., 6.3 g., 3.16 g. and 1.6 g. respectively, were added to the flask and stirring continued for 15 minutes at 80° to 90° C. In each experiment 10 g. of methyl methacrylate and 0.1 g. of azobisisobutyronitrile was added. The nitrogen inlet tube was then replaced by a dropping funnel from which 44 g. of methyl methacrylate and 0.1 g. of azobisisobutyronitrile in 35 ml. of toluene-butanol was gradually added to the flask over a period of 30 minutes. Stirring was continued for 2 hours. The polymer salt composition product was isolated in each example by coagulation in n-hexane. Alternatively emulsions or dispersions of these polymer salt composition products were obtained by adding about 200 ml. of methanol to the reaction mixture at about 60° C. followed by cooling to room temperature with stirring.

Laminates of sheets of commercially available polyvinyl chloride resin (plasticized with dioctyl phthalate) and low density polyethylene panels each bonded to aluminum Q panels were prepared using the polymer salt compositions obtained in examples 5–10 as the adhesive. The bonding conditions were 160° to 170° C. at 20 to 200 p.s.i. for about 0.5 to 5 minutes. The peel strength values of the laminates thus obtained are presented in table II:

TABLE II

| | Peel strength, lbs./linear inch | |
|---|---|---|
| Example | Polyvinyl chloride-aluminum | Polyethylene-aluminum |
| 5 | 10.0 | 1 |
| 6 | 7.0 | 1.5 |
| 7 | 10.0 | 2.0 |
| 8 | 12.0 | 4.0 |
| 9 | 12.0 | 16.0 |
| 10 | 2.0 | 17.0 |

The use of the polymer salt composition product of Example 2 in films, 10 to 15 mils thick, was also demonstrated as an adhesive for the fabrication of laminates of various materials. The laminating condition, temperatures and peel strength values are given in table III.

TABLE III

| Laminate | Lamination temperature Temp., ° C. | Pressure, p.s.i. | Time/ min. | Peel strength, lb./in. | Adhesive thickness, mils. |
|---|---|---|---|---|---|
| Vinyl resin[1] polyurethane[2] foam. | 200 | 15 | 1 | Exceeds cohesive strength of polyurethane foam. | 10–15 |
| Vinyl resin[3] aluminum. | 195 | 15 | 1.5 | 16 | 10–15 |
| Vinyl resin[3]/Douglas fir plywood. | 200 | 10 | 1.5 | 7 | 10–15 |
| Aluminum foil/ window glass. | 210 | 21 | 3 | 10 | 10–15 |
| Polyvinyl chloride galvanized steel. | 140 | 33 | 3 | 3.5 | 3.4 |
| Impact polystyrene[4]/vinyl resin[3] | 160 | 28 | 3.6 | 2.75–3.0 | 5.8 |

TABLE III — Continued

| Laminate | Lamination temperature Temp., °C. | Pressure, p.s.i. | Time, min. | Peel strength, lb./in. | Adhesive thickness, mils. |
|---|---|---|---|---|---|
| Dynel cloth [5]/ vinyl resin [3]. | 130 | 84 | 2.0 | 9.0 | |

[1] Vinyl chloride/vinyl acetate (98/2) copolymers plasticized with polyester plasticizer.
[2] Polyurethane foam made from 2,4-tolylenediisocyanate, polypropylene glycol and water.
[3] Vinyl chloride/vinyl acetate (98/2) copolymer plasticized with dioctyl phthalate.
[4] Polystyrene modified with about 12% rubber.
[5] The Dynel cloth was immersed in an emulsion of the polymer salt composition product of Example 5, squeezed lightly, dried at 60° C. for about 15 minutes and then laminated to vinyl resin sheets.

EXAMPLES 11–13

Sheets of paperlike olefin polymer compositions such as those described in U.S. Pat. No. 3,234,313 and Belgian Pat. Nos. 6,719, 27,600, and 23,693 published respectively on Dec. 16, 1964, Feb. 4, 1966 and May 3, 1966 were coated with an emulsion of the polymer salt composition product of Example 9 and dried at 50° C. for 8 to 10 minutes. These precoated sheets were then bonded at 120° to 130° C. under a pressure of 40 to 80 p.s.i. for 18–40 seconds to sheets of polystyrene containing 6 percent mineral oil, 12 percent rubber modified polystyrene, or unplasticized vinyl chloride resin. The peel strength of the resultant laminates were 5, 4 and 7 lb./in. respectively when measured 1 hour after lamination. When measured again after 3 days these values had increased in each example to greater than 14 lb./in.

It is to be understood that the polymer salt compositions of this invention can also be used to provide decorative and/or protective overlays on any of the hereinbefore described substrates. If desired these overlays can contain conventional pigments, stabilizers, antioxidants, fillers, and plasticizers well known in the art.

EXAMPLE 14

An emulsion of the polymer salt composition product of Example 5 was added to panels of Douglas fir plywood and dried. The resultant coatings were glossy giving the appearance of finished wood and were hard as evidenced by their resistance to scratching with a Starrett scriber under conditions which clearly scored the same uncoated wood panels.

EXAMPLES 15–20

In a series of experiments an ethylene-acrylic acid copolymer containing about 18 percent of acrylic acid copolymerization therein and having a melt index of about 80 dg./min. was neutralized with varying amounts of dimethylaminoethyl methacrylate and then copolymerized with methyl methacrylate using the method described in Example 1. The amounts were chosen to afford ratios of moles of dimethylaminoethyl methacrylate to moles of carboxyl abbreviated as:

$$\frac{\text{mole DMAEM}}{\text{mole COOH}}$$

of 0.1, 0.2, 0.4, 0.6, 0.8 and 1.0. The peel values of vinyl-aluminum and polyethylene-aluminum laminates bonded with these polymer salts were recorded in table IV.

Although the invention has been described in its preferred forms with a certain degree of particularity, it is understood that the present disclosure of the preferred forms has been made only by way of example and that numerous changes may be resorted to without departing from the spirit and the scope of the invention.

What is claimed is:

1. A reversibly cross-linked, thermoplastic, normally solid polymer salt composition comprising:
   A. about 20 to 80 percent by weight of a prepolymer of a random copolymer of an α-olefin and an α, β-ethylenically unsaturated monocarboxylic acid and about 10 to 100 mole percent of said carboxyl groups neutralized with an amino vinyl monomer selected from the class consisting of alkylaminoalkyl acrylates, alkylaminoalkyl methacrylates and amino substituted styrenes having the structure

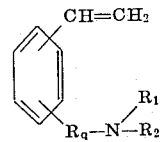

wherein $q$ is an integer having values of 0 to 1, R is a divalent aliphatic radical having from one to six carbon atoms, and each of $R_1$ and $R_2$ is a monovalent radical selected from the group consisting of hydrogen and alkyl radicals having from one to six carbon atoms, said prepolymer being copolymerized with
   B. about 80 to 20 percent by weight of a vinyl monomer selected from the class consisting of alkyl acrylates, alkyl methacrylates, acrylamide, methacrylamide, styrene, alkyl substituted styrenes, vinyl chloride, vinyl esters containing from about three to 20 carbon atoms and vinyl alkyl ethers containing from about three to 30 carbon atoms.

2. The composition claimed in claim 1 wherein the random copolymer of an α-olefin and an α, β-ethylenically unsaturated monocarboxylic acid is an ethylene/acrylic acid copolymer containing from about 2 to 50 mole percent acylic acid copolymerized therein.

3. The composition claimed in claim 2 wherein the amino vinyl monomer is diethylaminoethyl acrylate and the vinyl monomer is methyl methacrylate.

4. The composition claimed in claim 2 wherein the amino vinyl monomer is diethylaminoethyl methacrylate and the vinyl monomer is methyl methacrylate.

5. The composition claimed in claim 2 wherein the amino vinyl monomer is dimethylaminoethyl methacrylate and the vinyl monomer is methyl methacrylate.

6. An article comprising a laminate of at least one of the polymer salt compositions claimed in claim 1 adhesively bonded to substrates selected from the class consisting of metals, vinyl chloride resins, cellulosic materials, siliceous materials, vinylidene chloride polymers, paperlike olefin polymer compositions, polyurethanes, polystyrenes, rubber modified styrene polymers, and magnetic metal oxides.

7. Method for preparing a reversibly cross-linked thermoplastic, normally solid polymer salt composition which comprises the steps of:
   a. intimately admixing a random copolymer of an α-olefin and an α, β-ethylenically unsaturated monocarboxylic

TABLE IV

| | Degree of neutralization vs. adhesive strength | | | | | |
|---|---|---|---|---|---|---|
| Example | EAA[1] Wt., g. | DMAEM[2] Wt., g. | MMA[3] Wt., g. | Mole DMAEM / Mole COOH | Peel strength lb./in. @ 2"/min. peel rate | |
| | | | | | Vinyl-Al | PE[4]-Al |
| 15 | 40.6 | 1.7 | 57.7 | 0.1 | 2 | 17 |
| 16 | 40.0 | 3.2 | 56.8 | 0.2 | 12 | 15 |
| 17 | 38.7 | 6.4 | 54.9 | 0.4 | 12 | 3–4 |
| 18 | 37.5 | 9.3 | 53.2 | 0.6 | 10 | 2 |
| 19 | 36.4 | 12.0 | 51.6 | 0.8 | 7 | 1–2 |
| 20 | 35.5 | 14.5 | 50.0 | 1.0 | 10 | 1 |

[1] Ethylene-acrylic acid copolymer, 18% acrylic acid, Ml 80 dg./min.
[2] Dimethylaminoethyl methacrylate.
[3] Methyl methacrylate.
[4] Low density polyethylene.

acid having from 2 to 50 mole percent carboxyl groups therein with an amino vinyl monomer selected from the class consisting of alkylaminoalkyl acrylates, alkylaminoalkyl methacrylates, and amino substituted styrenes; and b. copolymerizing about 20 to 80 percent by weight of the reaction product of (a) with about 80 to 20 percent by weight of a vinyl monomer selected from the class consisting of alkylacrylates, alkylmethacrylates, acrylamide, methacrylamide, styrene, alkyl substituted styrenes, vinyl chloride, vinyl esters containing from about three to 20 carbon atoms and vinyl alkyl ethers containing from about three to 30 carbon atoms; and c. recovering resultant polymer salt composition.

8. The method claimed in claim 7 wherein the random copolymer of an α-olefin and an α, β-ethylenically unsaturated monocarboxylic acid is an ethylene acrylic acid copolymer containing from about 2 to 50 percent acrylic acid copolymerized therein.

9. The method claimed in claim 8 wherein the amino vinyl monomer is diethylaminoethyl acrylate and the vinyl monomer is methyl methacrylate.

10. The method claimed in claim 8 wherein the random copolymer of an α-olefin and an α, β-ethylenically unsaturated monocarboxylic acid is an ethylene acrylic acid copolymer having from about 3 to 45 percent acrylic acid copolymerized therein and the amino vinyl monomer is dimethylaminoethyl methacrylate.

11. Method for providing protective coatings on a substrate selected from the class consisting of metals, vinyl chloride resins, cellulosic materials, siliceous materials, vinylidene chloride polymers, paperlike olefin polymer compositions, polyurethanes, polystyrenes and rubber modified styrene polymers which comprises applying a dispersion of a reversibly cross-linked, thermoplastic, normally solid polymer salt composition comprising:

A. a prepolymer of a random copolymer of an α-olefin and an α, β-ethylenically unsaturated monocarboxylic acid having 2 to 50 mole percent carboxyl groups and about 10 to 100 mole percent of said carboxyl groups neutralized with an amino vinyl monomer selected from the class consisting of alkylaminoalkyl acrylates, alkylaminoalkyl methacrylates and amino substituted styrenes having the structure

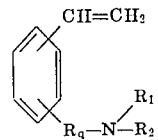

wherein $q$ is an integer having values of 0 to 1, R is an divalent aliphatic radical having from one to six carbon atoms, and each of $R_1$ and $R_2$ is a monovalent radical selected from the group consisting of hydrogen and alkyl radicals having from one to six carbon atoms, said prepolymer being copolymerized with B. about 80 to 20 percent by weight of a vinyl monomer selected from the class consisting of alkyl acrylates, alkyl methacrylates, acrylamide, methacrylamide, styrene, alkyl substituted styrenes, vinyl chloride, vinyl esters containing from about three to 20 carbon atoms and vinyl alkyl ethers containing from about three to 30 carbon atoms, to the surface of said substrate, and drying said substrate.

12. Article claims in claim 6 consisting of vinyl chloride polymer bonded to a wire.

13. Article claimed in claim 12 wherein the wire is copper.

14. Article claimed in claim 6 wherein one structure is magnetic iron oxide.

* * * * *